United States Patent
Ohnemus et al.

(10) Patent No.: US 9,007,052 B2
(45) Date of Patent: Apr. 14, 2015

(54) VOLTAGE SENSING IN ISOLATED CONVERTERS

(75) Inventors: Jason A. Ohnemus, Rockford, IL (US); David A. Fox, Rockford, IL (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 308 days.

(21) Appl. No.: 13/559,108

(22) Filed: Jul. 26, 2012

(65) Prior Publication Data
US 2014/0028289 A1 Jan. 30, 2014

(51) Int. Cl.
*H02M 3/335* (2006.01)
*H02M 3/337* (2006.01)

(52) U.S. Cl.
CPC .................................. *H02M 3/3376* (2013.01)

(58) Field of Classification Search
CPC ..................... H02M 3/33507; H02M 3/33523; H02M 3/3376; H02M 2001/0003; H02M 2001/0006
USPC ............... 324/127, 117 R, 76.11, 140 R, 176; 363/15, 16, 21.07, 21.08, 78, 79, 95, 363/97, 21
See application file for complete search history.

(56) References Cited

U.S. PATENT DOCUMENTS

| | | | |
|---|---|---|---|
| 5,138,543 A * | 8/1992 | Harm et al. | 363/21.08 |
| 6,370,039 B1 * | 4/2002 | Telefus | 363/15 |
| 2005/0073862 A1 | 4/2005 | Mednik | |
| 2010/0157628 A1 * | 6/2010 | Mangraviti et al. | 363/16 |
| 2010/0165666 A1 | 7/2010 | Wang et al. | |
| 2010/0195355 A1 * | 8/2010 | Zheng | 363/21.12 |
| 2011/0292691 A1 * | 12/2011 | Matsumoto et al. | 363/21.12 |
| 2012/0087159 A1 * | 4/2012 | Chapman et al. | 363/41 |

OTHER PUBLICATIONS

European Search Report dated Jun. 12, 2014 for EP 13176487.

* cited by examiner

*Primary Examiner* — Arleen M Vazquez
*Assistant Examiner* — Neel Shah
(74) *Attorney, Agent, or Firm* — Kinney & Lange, P.A.

(57) ABSTRACT

A system for sensing voltage in an isolated converter includes an input circuit isolated from an output circuit using a first transformer, the first transformer having a primary coil and a secondary coil, wherein the output circuit includes an output inductor and an output capacitor, and wherein the input circuit includes a power source that provides power to the output circuit through the first transformer; a feedback winding coupled to the output inductor to form a second transformer; and a monitor circuit that calculates a voltage across the output capacitor using a voltage across the feedback winding, a voltage across the primary coil of the first transformer, a turns ratio of the first transformer, and a turns ratio of the second transformer in order to provide feedback to control the input circuit.

16 Claims, 3 Drawing Sheets

US 9,007,052 B2

VOLTAGE SENSING IN ISOLATED CONVERTERS

BACKGROUND

The present invention relates to isolated power converters, and in particular to voltage sensing for isolated power converters.

Isolated converters are used to provide isolated power to a load. This isolation is generally provided through the use of an isolation transformer between an input power stage and an output power stage. This allows energy to be transferred from the input stage to the output stage while allowing each stage to be grounded to a different potential.

The voltage in the output stage needs to be controlled in order to provide proper voltage to the load. Because the output stage receives power from the input stage, the output voltage is controlled by controlling the flow of energy from the input source. Therefore, measurements must be made in the output stage and used to control the input stage. This becomes a problem due to the isolation between the two stages. Given that the ground potential for each of the stages are often, by design, at different potentials, voltages in the output stage cannot be directly compared to voltages in the input stage. Thus, in some designs, the output voltage must be brought back across the isolation barrier in order to be used for the controls for the input stage. This has been accomplished in the past through the use of isolated operational amplifiers, additional feedback windings on the isolation transformer, or digitization of the voltage along with feedback through optical isolation. All of these methods have drawbacks such as unreliability, added complexity and added cost.

SUMMARY

A system for sensing voltage in an isolated converter includes an input circuit isolated from an output circuit using a first transformer, the first transformer having a primary coil and a secondary coil, a feedback winding coupled to the output inductor to form a second transformer, and a monitor circuit. The output circuit includes an output inductor and an output capacitor, and the input circuit includes a power source that provides power to the output circuit through the first transformer. The monitor circuit calculates a voltage across the output capacitor using a voltage across the output inductor's feedback winding, a voltage across the primary coil of the first transformer, and a turns ratio of the first transformer as well as a turns ratio of the second transformer in order to provide feedback to control the input circuit.

DETAILED DESCRIPTION

The present invention describes a system and method for sensing voltage in isolated converters. The isolated converter has an input circuit and an output circuit. The input and output circuits are isolated from one another using an isolation transformer. The output circuit utilizes an output inductor for normal operation of the converter. A second winding is coupled to the output inductor to form a second isolation transformer. The voltage across the inductor's second winding is provided to a monitor circuit that calculates an output voltage of the output circuit. The monitor circuit has the same ground reference as the control circuitry. Therefore, the voltage across the second winding of the inductor, along with voltages measured in the input circuit, can be used to calculate the output voltage of the output circuit. This calculated output voltage is used as feedback to control the power provided by the input circuit. This provides a light-weight, reliable way to sense the output voltage while keeping the control solely on the input side of the isolated converter.

Figure 1:
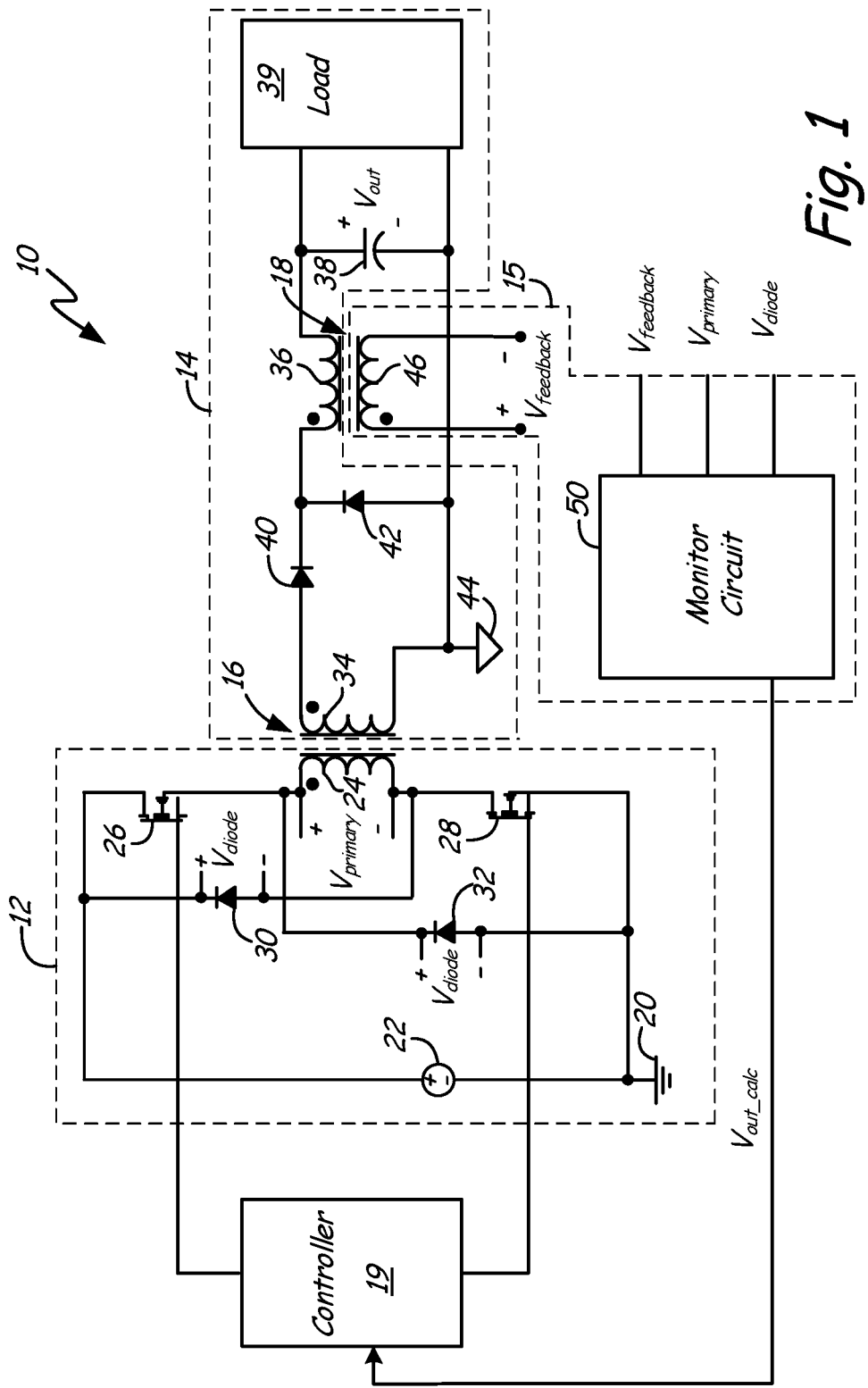
FIG. 1 is a block diagram illustrating a system for sensing an output voltage of an isolated converter according to an embodiment of the present invention.

FIG. 1 is a block diagram illustrating system 10 for voltage sensing in isolated converters. System 10 includes the converter input power stage 12, the converter output power stage 14, feedback circuit 15, isolation transformers 16 and 18, and controller 19. Input power stage 12 includes input ground 20, power source 22, primary coil 24 of isolation transformer 16, power switches 26 and 28, and diodes 30 and 32. Output power stage 14 includes secondary coil 34 of isolation transformer 16, filter inductor 36 which is used as the primary coil of isolation transformer 18, output capacitor 38, load 39, diodes 40 and 42, and output common ground 44. Ground Feedback circuit 15 includes secondary coil 46 of isolation transformer 18 and monitor circuit 50. The voltage across output capacitor 38 is provided to power a load. Controller 19 is used to control switches 26 and 28 to adjust power provided to output circuit 14, and therefore to load 39. Controller 19 is any known control circuit, such as, for example, a pulse-width modulation (PWM) controller integrated circuit. Although illustrated as a forward converter, system 10 may be implemented as any type of isolated converter that utilizes an inductor in its output power stage.

Power source 22 provides power to system 10. Power source 22 is any known direct current (DC) voltage source such as, for example, a battery or a converted voltage from an alternating current (AC) main power supply. Power switches 26 and 28 are turned ON and OFF by controller 19 to provide power to isolation transformer 16. Power switches 26 and 28 are any known power switches, such as metal-oxide-semiconductor field-effect transistors (MOSFETs), or insulated gate bipolar transistors (IGBTs). Switches 26 and 28 are enabled at a given duty cycle in order to generate a voltage in secondary coil 34 of transformer 16. Transformer 16 provides an isolation barrier between input circuit 12 and output circuit 14. Thus, input ground 20, which may be, for example, an earth ground, can be at a different potential than output common ground 44. Because of this, controller 19 cannot directly measure the voltage across output capacitor 38 while also controlling input circuit 12. Thus, feedback circuit 15 utilizes the voltage monitored across primary coil 24 of isolation transformer 16 and the voltage monitored across secondary coil 46 of isolation transformer 18, both of which monitored voltages are galvanically isolated from output circuit 14, to calculate the output voltage $V_{out}$ across capacitor 38. In addition, monitor circuit 50 may utilize a voltage drop indicative of a diode drop to improve the accuracy of the measurement.

Specifically, secondary coil 46 is used to create a second isolation transformer 18. Inductor 36, which is also used for normal system operation of output power stage 14 of the isolated converter, is also utilized as the primary coil of isolation transformer 18. Any turns ratio between inductor 36 and secondary coil 46 may be selected, such as a 1:1 ratio.

Thus, the voltage across inductor 36 can be monitored by measuring the voltage across secondary coil 46. Secondary coil 46 is tied to the same ground as the controls. This ground may be equal to input ground 20, or may be a different ground if isolation between the controls and input power stage 12 is desired. If isolation between the controls and input power stage 12 is desired, an additional winding may be implemented on isolation transformer 16.

The voltage across capacitor 38, which is the output voltage that is provided to load 39, can be calculated by monitor circuit 50 as follows:

$$V_{out} = V_{secondary} * D - V_{diode} - V_{inductor} \quad [1]$$

where $V_{out}$ is the voltage across capacitor 38, $V_{secondary}$ is the voltage across secondary coil 34 of isolation transformer 16, D is the duty cycle for which switches 26 and 28 are enabled, $V_{diode}$ is the voltage across either diode 40 or 42, and $V_{inductor}$ is the voltage across inductor 36.

The voltage across secondary coil 34 ($V_{secondary}$) can be calculated as:

$$V_{secondary} = (N_{secondary}/N_{primary}) * V_{primary} \quad [2]$$

where $N_{secondary}$ is the number of turns in secondary coil 34, $N_{primary}$ is the number of turns in primary coil 24, and $V_{primary}$ is the voltage across primary coil 24. Therefore, $V_{out}$ can be calculated as:

$$V_{out} = (N_{secondary}/N_{primary}) * V_{primary} * D - V_{diode} - V_{feedback} \quad [3]$$

where $V_{feedback}$ is equal to $V_{inductor}$ assuming a 1:1 turns ratio for transformer 18. If transformer 18 does not have a 1:1 turns ratio, $V_{inductor}$ can be determined by multiplying $V_{feedback}$ by the turns ratio of transformer 18.

Using equation [3], $V_{out}$ can be determined without any reference to voltages within output circuit 14. $V_{primary}$ can be obtained either directly by measuring the voltage across primary coil 24 of isolation transformer 16, or by utilizing an additional feedback winding on isolation transformer 16. ($N_{secondary}/N_{primary}$) is a known ratio and can be implemented using, for example, a voltage divider. The voltage across primary coil 24 would be fed into the voltage divider, and the resistors of the voltage divider selected to produce a voltage indicative of multiplying the voltage across primary coil 24 by the ratio of ($N_{secondary}/N_{primary}$). $V_{diode}$ may be estimated using the expected voltage across diodes 40 and 42 depending on the type of diode used. $V_{feedback}$ is obtained by measuring the voltage across secondary coil 46. These values can be provided to monitor $V_{out}$ so that controller 19 may control input circuit 12 accordingly.

Figure 2:
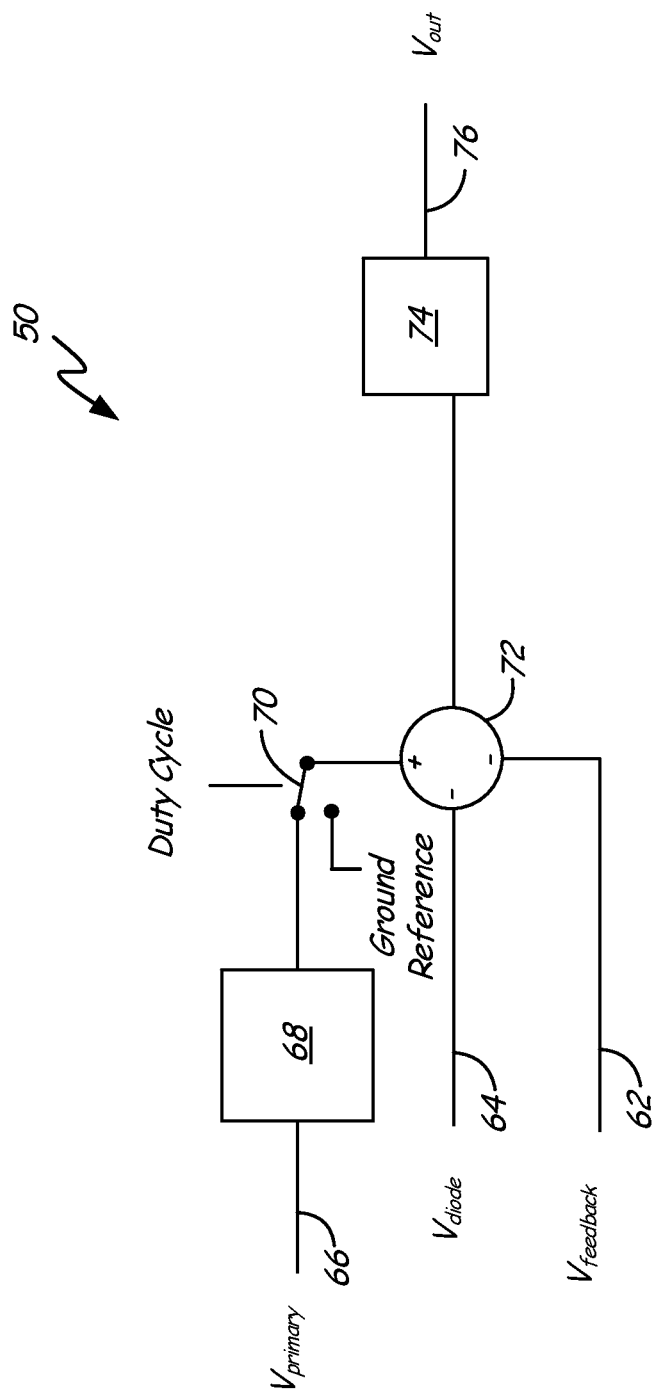
FIG. 2 is a block diagram illustrating a monitor circuit used to determine an output voltage of an isolated converter according to an embodiment of the present invention.

FIG. 2 is a block diagram illustrating monitor circuit 50 according to an embodiment of the present invention. Monitor circuit 50 includes feedback voltage input 62, diode voltage input 64, $V_{primary}$ input 66, voltage divider circuit 68, switch 70, summing circuit 72, low pass filter 74, and output voltage 76.

The voltage provided to $V_{primary}$ input 66 is the voltage across primary coil 24 of transformer 16. This voltage is provided to voltage divider 68. The output of voltage divider 68 is representative of the voltage across secondary coil 34 ($V_{secondary}$). The voltage across secondary coil 46 of transformer 18 is provided to feedback voltage input 62. The voltage provided to diode voltage input 64 can either be a reference voltage, such as 0.7 volts, or any other voltage representative of the diode drop across 40 and 42 so long as it is referenced to the same ground potential as the control circuit.

Switch 70 is controlled by controller 19 and is enabled at the same duty cycle as switches 26 and 28 in order to properly simulate the actual voltage across secondary coil 34 of isolation transformer 16. The output of switch 70 is provided to summing circuit 72. The voltage on diode voltage input 64 and the voltage on feedback voltage input 62 are also provided to summing circuit 72 to produce a voltage representative of the voltage across capacitor 38. Low pass filter 74 is utilized to eliminate any noise on voltage output 76 due to the switching of switch 70. Voltage output 76 is provided to controller 19 as feedback so that input circuit 12 may be controlled appropriately to adjust the output voltage provided to load 39.

Figure 3:
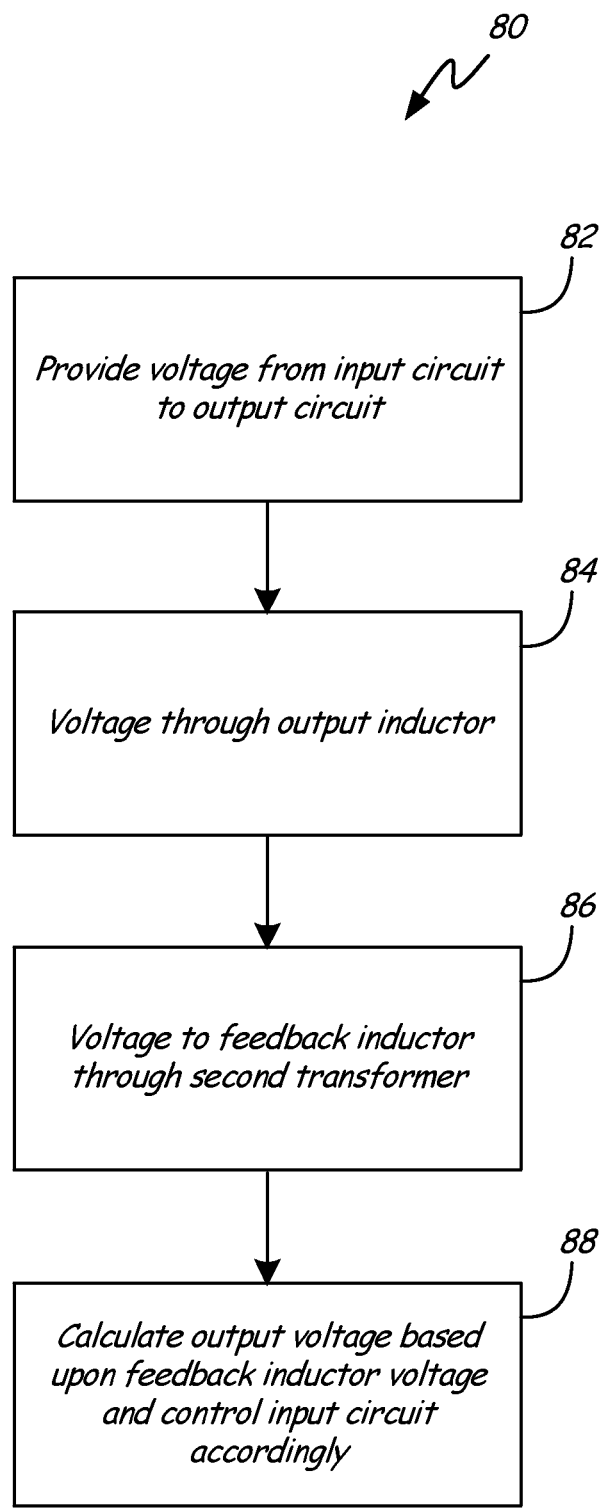
FIG. 3 is a flowchart illustrating a method for sensing an output voltage of an isolated converter according to an embodiment of the present invention.

FIG. 3 is a flowchart illustrating a method 80 for sensing an output voltage in an isolated converter. At stage 82, Switches 26 and 28 are enabled at a duty cycle determined by controller 19 in order to provide voltage from input power stage 12 to output power stage 14 through isolation transformer 18. At stage 84, a voltage is provided as an output from output power stage 14 through inductor 36. At stage 86, the voltage across inductor 36 generates a voltage on secondary coil 46 of isolation transformer 18. At stage 88, the voltage across secondary coil 46 and a voltage representative of the voltage drop across diodes 40 and 42 are subtracted from the voltage across secondary coil 34 of transformer 16. The voltage across secondary coil 34 is simulated using the voltage across primary coil 24 and the known turns ratio of transformer 16, as well as switch 70 to simulate the duty cycle of the power provided to primary coil 24 of transformer 16.

The present invention describes a system and method for voltage sensing in isolated converters. Although the present invention has been described with reference to preferred embodiments, workers skilled in the art will recognize that changes may be made in form and detail without departing from the spirit and scope of the invention.

The invention claimed is:

1. An isolated converter comprising:
   a first transformer;
   an input circuit connected to a primary coil of the first transformer and having at least one switch for regulating power supplied to the primary coil;
   an output circuit connected to a secondary coil of the first transformer that receives power supplied by the input circuit via the first transformer and supplies received power to a load via an output inductor;
   a feedback winding coupled to the output inductor to form a second transformer;
   a monitor circuit that calculates a voltage supplied to the load using a voltage across the feedback winding, a voltage across the primary coil of the first transformer, a turns ratio of the first transformer, and a turns ratio of the second transformer, wherein the monitor circuit comprises:
   a voltage divider that calculates a voltage across the secondary coil of the first transformer based upon the voltage across the primary coil of the first transformer and the turns ratio of the first transformer; and
   a summing circuit that calculates the voltage supplied to the load by the output circuit by subtracting the voltage across the feedback winding from the calculated voltage across the secondary coil of the first transformer; and
   a controller that controls the at least one switch based on the voltage calculated by the monitor circuit to regulate the power supplied to the primary coil.

2. The system of claim 1, wherein the input circuit is referenced to a first ground potential and the output circuit is referenced to a second ground potential.

3. The system of claim 2, wherein the feedback winding associated with the second transformer is referenced to the first ground potential.

4. The system of claim 1, wherein the controller enables the at least one switch at a duty cycle selected based on the voltage calculated by the monitor circuit.

5. The system of claim 1, wherein the monitor circuit further includes:
a second switch connected between the voltage divider and the summing circuit that is turned ON and OFF at a duty cycle in accordance with the duty cycle of the at least one switch.

6. The system of claim 5, wherein the monitor circuit further comprises a low pass filter connected to filter the output of the summing circuit.

7. The system of claim 1, wherein the output circuit and input circuit both include one or more diodes, and wherein the monitor circuit calculates the voltage across the output capacitor further using a voltage across one of the one or more diodes of the input circuit.

8. A method for sensing voltage in an isolated converter that includes an input circuit, an output circuit, and a first isolation transformer having a primary coil and a secondary coil, the method comprising:
providing a voltage from the input circuit to the output circuit using the first isolation transformer;
transferring electrical energy from an output inductor of the output circuit to a feedback winding, wherein the feedback winding and the output inductor are coupled together to form a second transformer;
calculating an output voltage of the output circuit using a voltage across the feedback winding, a voltage across the primary coil of the first isolation transformer, a turns ratio of the first isolation transformer, and a turns ratio of the second isolation transformer, wherein calculating an output voltage comprises:
calculating a voltage across the secondary coil of the first isolation transformer by providing the voltage across the primary coil of the first isolation transformer to a voltage divider circuit; and
calculating the output voltage by adding the calculated voltage across the secondary coil of the first isolation transformer and subtracting the voltage across the feedback winding using a summing circuit, wherein the calculated voltage across the secondary coil is enabled and disabled to the summing circuit at the same duty cycle as the one or more power switches; and
providing the calculated output voltage to a controller to control the input circuit.

9. The method of claim 8, wherein providing a voltage from the input circuit comprises enabling power to the primary coil of the first isolation transformer at a given duty cycle using one or more power switches.

10. The method of claim 9, wherein calculating the output voltage further includes applying a low pass filter to the calculated output voltage.

11. A feedback circuit that calculates an isolated output voltage provided by an isolated converter to a load based on non-isolated monitored inputs, wherein the isolated transformer includes at least an input circuit, an output circuit, and a first isolation transformer having a primary winding connected to the input circuit and a secondary winding connected to the output circuit, the feedback circuit comprising:
a feedback winding coupled to an output inductor of the output circuit to form a second isolation transformer; and
a monitor circuit that calculates a voltage across an output capacitor of the output circuit using a voltage across the feedback winding, a voltage across the primary coil of the first isolation transformer, a turns ratio of first isolation transformer, and a turns ratio of the second isolation transformer, wherein the monitor circuit comprises:
a voltage divider that calculates a voltage across the secondary coil of the first isolation transformer based upon the voltage across the primary coil of the first isolation transformer and the turns ratio of the first isolation transformer; and
a summing circuit that calculates the voltage across the output capacitor by subtracting the voltage across the feedback winding from the calculated voltage across the secondary coil of the first isolation transformer.

12. The feedback circuit of claim 11, wherein the input circuit is referenced to a first ground potential and the output circuit is referenced to a second ground potential.

13. The feedback circuit of claim 12, wherein the feedback winding associated with the second transformer is referenced to the first ground potential.

14. The feedback circuit of claim 11, wherein the monitor circuit further includes:
a second switch connected between the voltage divider and the summing circuit that is turned ON and OFF at a duty cycle in accordance with the duty cycle of the input circuit.

15. The feedback circuit of claim 14, wherein the monitor circuit further comprises a low pass filter applied to the calculated voltage across the output capacitor.

16. The feedback circuit of claim 14, wherein the output circuit and input circuit both include one or more diodes, and wherein the monitor circuit calculates the voltage across the output capacitor further using a voltage across one of the one or more diodes of the input circuit.

* * * * *